US012798434B2

(12) United States Patent
Lee

(10) Patent No.: US 12,798,434 B2
(45) Date of Patent: Nov. 17, 2026

(54) BATTERY SWAPPING STATION AND BATTERY CHARGING METHOD USING SAME ELECTRONIC DEVICE

(71) Applicant: LG ENERGY SOLUTION, LTD., Seoul (KR)

(72) Inventor: Sunggun Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 673 days.

(21) Appl. No.: 18/276,843

(22) PCT Filed: Oct. 13, 2022

(86) PCT No.: PCT/KR2022/015508
§ 371 (c)(1),
(2) Date: Aug. 10, 2023

(87) PCT Pub. No.: WO2023/075227
PCT Pub. Date: May 4, 2023

(65) Prior Publication Data
US 2024/0100986 A1 Mar. 28, 2024

(30) Foreign Application Priority Data
Oct. 26, 2021 (KR) ........................ 10-2021-0143778

(51) Int. Cl.
*H01M 10/44* (2006.01)
*B60L 53/80* (2019.01)
(Continued)

(52) U.S. Cl.
CPC ................ *B60L 53/80* (2019.02); *H02J 7/04* (2013.01); *H02J 7/575* (2026.01); *H02J 7/585* (2026.01);
(Continued)

(58) Field of Classification Search
CPC .... H02J 7/04; H02J 7/585; H02J 7/575; H02J 7/96; H02J 7/971; H02J 7/50; H02J 7/52;
(Continued)

(56) References Cited

U.S. PATENT DOCUMENTS 7,256,516 B2 * 8/2007 Buchanan ........... H01M 10/441 307/62
9,573,479 B2 2/2017 Yun et al.
(Continued)

FOREIGN PATENT DOCUMENTS

CN 102917909 A 2/2013
CN 107512181 A 12/2017
(Continued)

OTHER PUBLICATIONS

Chinese Office Action and Search Report for Chinese Application No. 202280016706.X, dated Nov. 27, 2025, with English translation.
(Continued)

*Primary Examiner* — Edward Tso
(74) *Attorney, Agent, or Firm* — Birch, Stewart, Kolasch & Birch, LLP

(57) ABSTRACT

A battery swapping station and a battery charging method using the same according to embodiments of the present invention may charge at least one battery accommodated in a battery charger according to a standard charge mode, a fast charge mode, and a discharge mode, thereby rapidly charging a target battery using allocated power provided from a grid and a charged battery without any additional power reinforcement work and preventing battery lifespan degradation caused from long-term persistence of fully charged state by adjusting a drain current of a battery that has been charged using the discharge mode, and thus, provide a
(Continued)

high-efficiency and low-cost battery swapping station and a battery charging method using the same.

18 Claims, 4 Drawing Sheets

(51) Int. Cl.

| | |
|---|---|
| ***H01M 10/46*** | (2006.01) |
| ***H02J 7/00*** | (2006.01) |
| ***H02J 7/04*** | (2006.01) |
| ***H02J 7/50*** | (2026.01) |
| ***H02J 7/82*** | (2026.01) |
| ***H02J 7/90*** | (2026.01) |
| ***H02J 7/96*** | (2026.01) |

(52) U.S. Cl.
CPC .............. *H02J 7/825* (2026.01); *H02J 7/875* (2026.01); *H02J 7/96* (2026.01); *H02J 7/971* (2026.01); *H02J 2207/20* (2020.01)

(58) Field of Classification Search
CPC ...... B60L 2210/10; B60L 53/80; B60L 53/11; B60L 58/12
USPC ........ 320/107, 109, 114, 115, 116, 117, 125, 320/132, 160
See application file for complete search history.

(56) References Cited

U.S. PATENT DOCUMENTS

| | | | | |
|---|---|---|---|---|
| 11,075,530 | B2 | 7/2021 | Luke et al. | |
| 11,101,677 | B2 | 8/2021 | Shih et al. | |
| 11,230,201 | B2 | 1/2022 | Lee et al. | |
| 11,447,105 | B2 * | 9/2022 | Shih | H02J 9/061 |
| 2004/0130292 | A1 | 7/2004 | Buchanan et al. | |
| 2013/0049677 | A1 | 2/2013 | Bouman | |
| 2016/0276860 | A1 * | 9/2016 | Yebka | H02J 7/865 |
| 2018/0299842 | A1 | 10/2018 | Reid et al. | |
| 2020/0148073 | A1 * | 5/2020 | Sasu | B60L 58/27 |
| 2020/0331358 | A1 | 10/2020 | Lee | |
| 2021/0175724 | A1 | 6/2021 | Chien et al. | |
| 2022/0185148 | A1 | 6/2022 | Kim | |

FOREIGN PATENT DOCUMENTS

| | | | |
|---|---|---|---|
| CN | 111969263 | A | 11/2020 |
| JP | 2002-216855 | A | 8/2002 |
| JP | 2007-535282 | A | 11/2007 |
| JP | 2011-87430 | A | 4/2011 |
| JP | 2011-147308 | A | 7/2011 |
| JP | 2012-8019 | A | 1/2012 |
| JP | 2015-15827 | A | 1/2015 |
| JP | 5874268 | B2 | 3/2016 |
| JP | 6306101 | B2 | 4/2018 |
| JP | 6371450 | B2 | 8/2018 |
| JP | 2019-176725 | A | 10/2019 |
| KR | 10-2012-0114490 | A | 10/2012 |
| KR | 10-1528079 | B1 | 6/2015 |
| KR | 10-2018-0049545 | A | 5/2018 |
| KR | 10-2019-0074215 | A | 6/2019 |
| KR | 10-2131287 | B1 | 7/2020 |
| KR | 10-2020-0116575 | A | 10/2020 |
| WO | WO 2014/009369 | A3 | 1/2014 |
| WO | WO 2018/104965 | A1 | 6/2018 |
| WO | WO 2021/183311 | A1 | 9/2021 |

OTHER PUBLICATIONS

International Search Report for PCT/KR2022/015508 mailed on Feb. 6, 2023.
Extended European Search Report for European Application No. 22887430.1, dated Nov. 20, 2024.
Japanese Office Action for Japanese Application No. 2023-547122, dated Dec. 16, 2024, with English translation.
Japanese Office Action for Japanese Application No. 2023-547122, dated Aug. 5, 2024, with English translation.

* cited by examiner

[Figure 1]
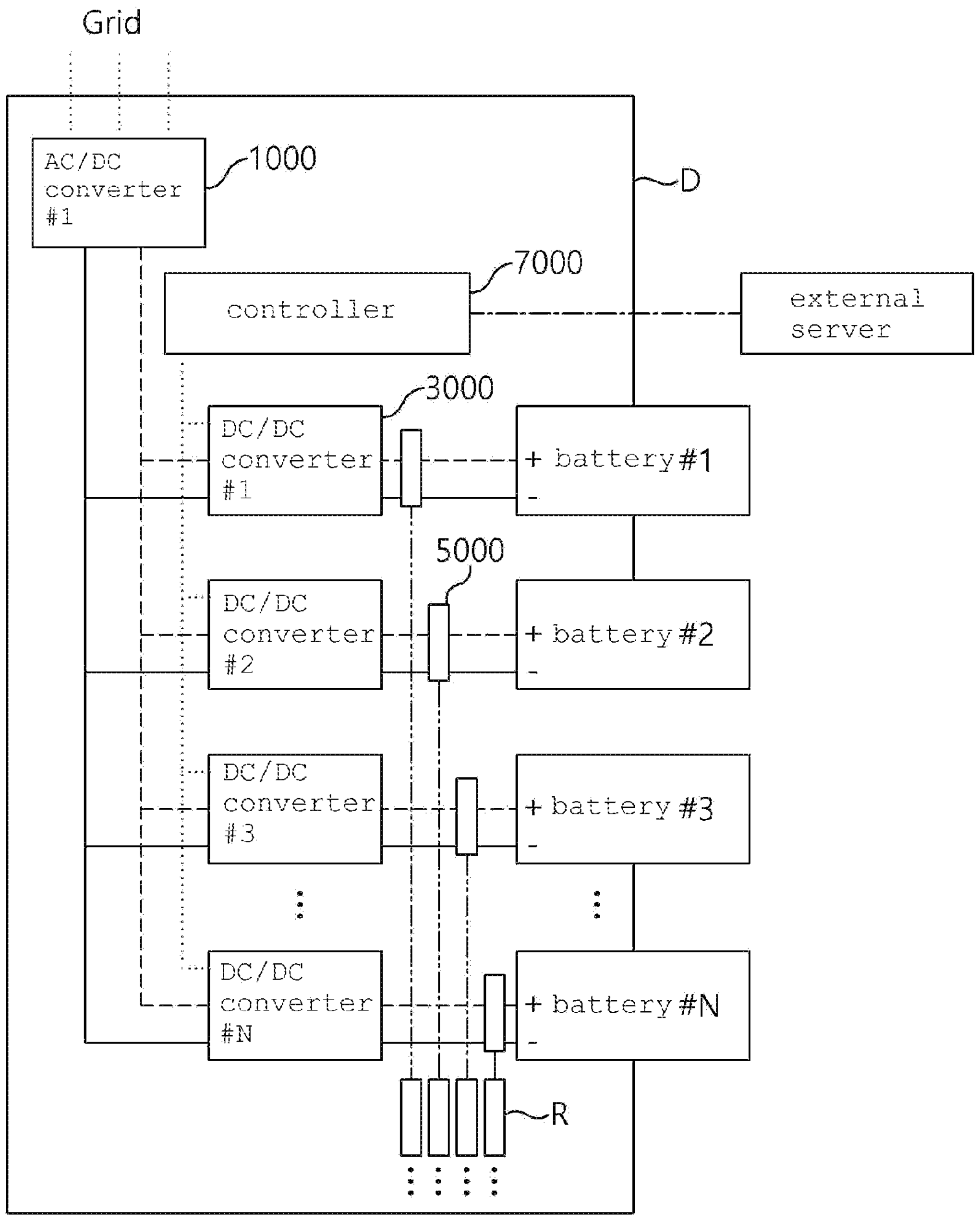

[Figure 2]
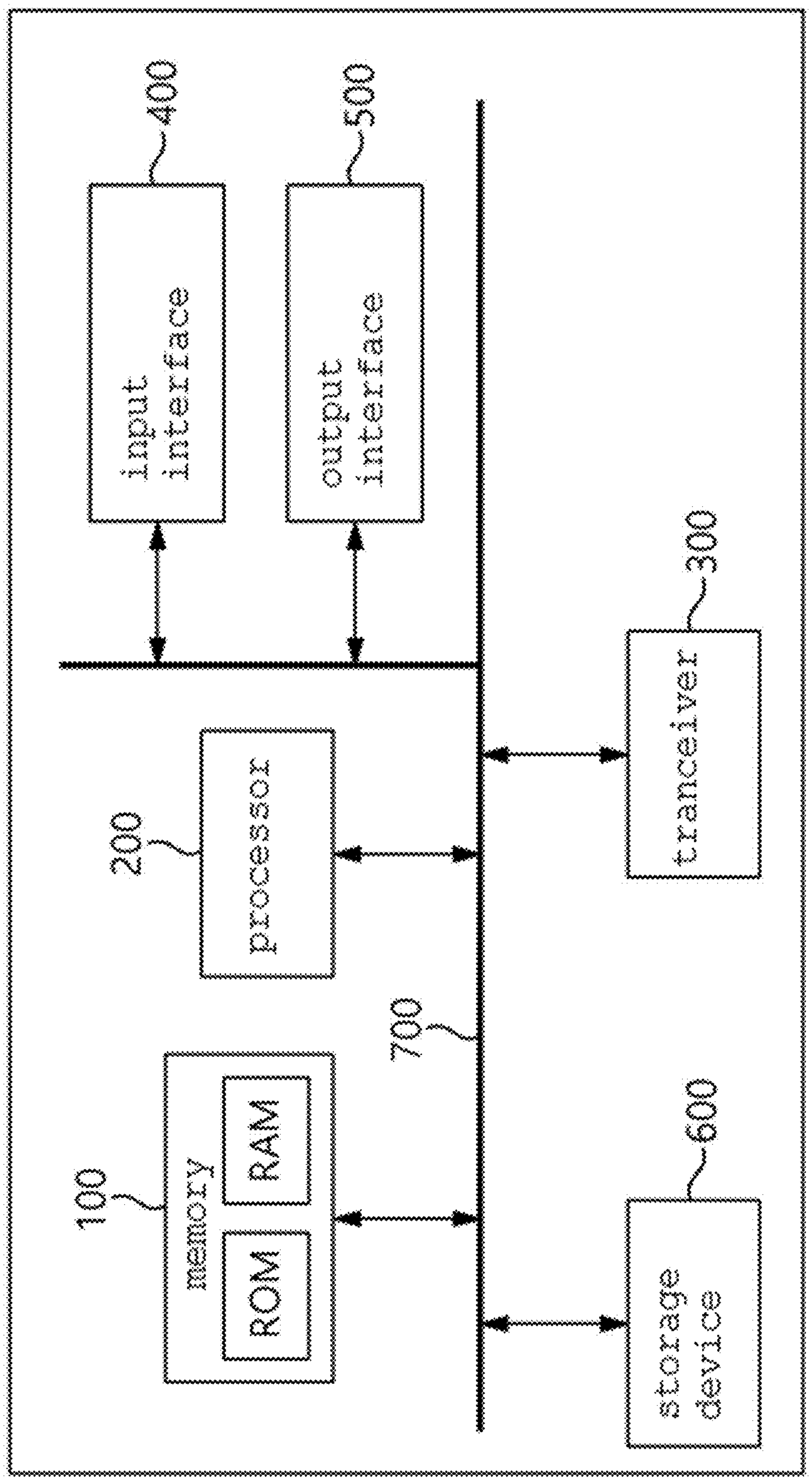

[Figure 3]
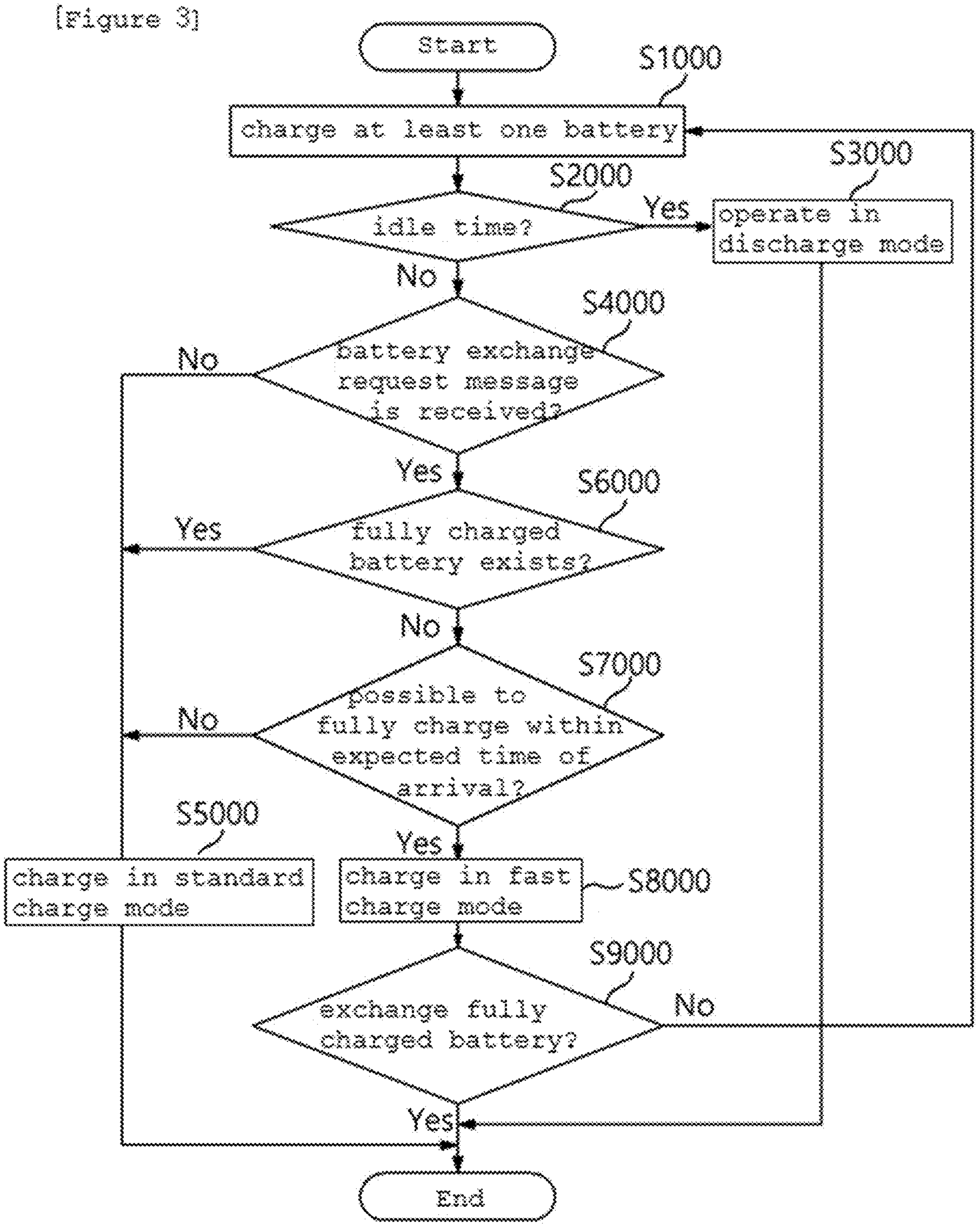

[Figure 4]
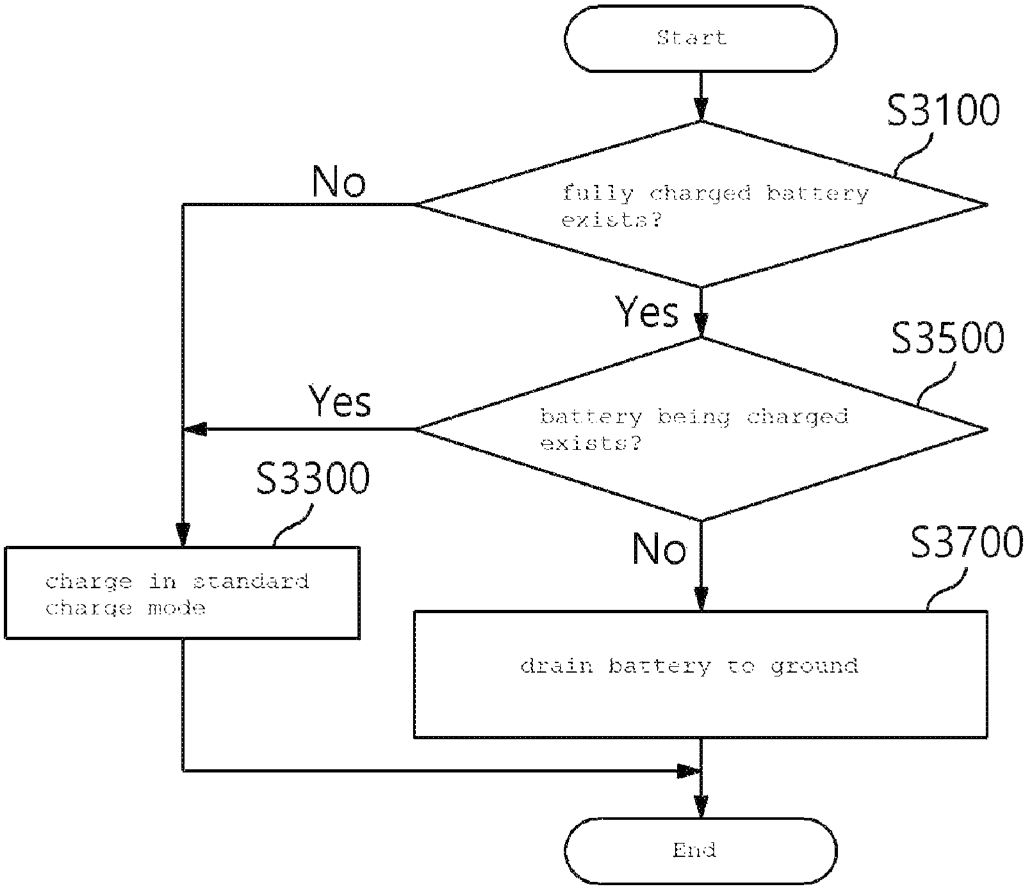

BATTERY SWAPPING STATION AND BATTERY CHARGING METHOD USING SAME ELECTRONIC DEVICE

TECHNICAL FIELD

This application claims priority to and the benefit of Korean Patent Application No. 10-2021-0143778 filed in the Korean Intellectual Property Office on Oct. 26, 2021, the entire contents of which are incorporated herein by reference.

The present invention relates to a battery swapping station and a method for charging a battery using the battery swapping station, and more particularly, to a battery swapping station capable of quick charging and a method for charging a battery using the battery swapping station.

BACKGROUND ART

As a problem of environmental pollution has emerged as a global social issue, various regulations restricting use of fuel vehicles are being implemented in each country, such as exhaust gas emission regulations.

Accordingly, the automobile industry is paying attention to a development of technology of electric vehicles which are eco-friendly vehicles that has high energy efficiency and can utilize existing electrical infrastructure.

In the field of developing technologies for commercialization of electric vehicles, it is essential not only to develop devices, but also to build a battery charging infrastructure.

A conventional battery swapping station (BSS) for battery charging is often additionally installed in existing buildings and power facilities such as convenience stores and public institutions.

Accordingly, a part of basic amount of power provided to an existing building is usually allocated for a conventional battery swapping station.

Therefore, the conventional battery swapping station has disadvantages that it is difficult to perform fast charging which requires a large amount of instantaneous power and that additional power reinforcement work is required for fast charging.

DETAILED DESCRIPTION OF THE INVENTION

Technical Problem

In order to solve the problem, an object of the present invention is to provide a high-efficiency and low-cost battery swapping station.

In order to solve the problem, the other object of the present invention is to provide a high-efficiency and low-cost method for charging a battery using the battery swapping station.

Technical Solution

In order to achieve the objective of the present disclosure, a battery swapping station (BSS), configured to charge at least one battery individually accommodated in at least one battery charger, may comprise: an AC/DC converter configured to convert external power provided in an alternating current (AC) form into a direct current (DC) form; a DC/DC converter including a first end connected to the AC/DC converter and a second end individually connected to at least one battery accommodation unit to individually provide a part of external power input from the AC/DC converter to the at least one battery accommodation unit; and a controller connected to the DC/DC converter and configured to control an operation of the DC/DC converter according to an operation in a standard charge mode or in a fast charge mode, and in a fast charge mode, select a target battery among at least one battery and fast charge the target battery.

The controller may further be configured to, upon operating in the standard charge mode, control the DC/DC converter to execute a buck mode to output a part of the external power as it is.

The DC/DC converter may be a bi-directional DC/DC converter.

The controller may further be configured to, upon operating in the fast charge mode, set input voltages of other DC/DC converters excluding a specific DC/DC converter higher than an output voltage of the specific DC/DC converter which is connected to the target battery to switch power transmission direction, thereby guiding charge current towards the target battery.

The controller may further be configured to operate in a discharge mode in the instance that a user does not use the battery swapping station for a preset idle time.

The battery swapping station may further comprise a switch individually connected between the at least one battery charger and the DC/DC converter and configured to ground the at least one battery by switching to an ON state in the instance that the controller is in a discharge mode.

According to another embodiment of the present disclosure, a method of charging the at least one battery individually accommodated in a battery charger by a battery swapping station may comprise: charging at least one battery accommodated in the battery charger; checking whether a battery exchange request message transferred from a user through an external server is received; operating in a standard charge mode and charging at least one battery accommodated in the battery charger in the instance that the battery exchange request message has not been received; checking whether a fully charged battery among the at least one battery exists in the instance that the battery exchange request message is received; and, in the instance that any fully charged battery does not exist, selecting a battery having the highest charge rate among the at least one battery as a target battery at the time when the battery exchange request message is transmitted and operating in a fast charge mode to fast charge the target battery.

The selecting a battery and operating in the fast charge mode to fast charge the target battery may include: in the instance that any fully charged battery does not exist, selecting a battery having the highest charge rate among the at least one battery as the target battery when the battery exchange request message is transmitted at the time; checking information about an expected time of arrival of the user and checking whether or not the target battery can be fully charged within the expected time of arrival of the user; and upon determining that it is possible to complete charging of the target battery within the expected time of arrival, fast charging the target battery by operating in the fast charge mode.

The method may further comprise, upon determining that it is not possible to complete charging of the target battery within the expected arrival time, maintaining operation in the standard charge mode to charge at least one non-charged battery among the at least one battery.

The operating in the fast charge mode may include: changing operation modes of other DC/DC converters except for a specific DC/DC converter connected to the target battery in the battery swapping station to a boost mode and setting set an input voltage of the other DC/DC converters higher than an output voltage of the specific DC/DC converter to switch power transmission direction, thereby guiding charge current towards the target battery.

The operating in the standard charge mode may include executing at least one DC/DC converter in the battery swapping station in a buck mode to equally distribute and output external power.

The method may further comprise charging at least one battery among the at least one battery that has not been fully charged by maintaining the operation in the standard charge mode in the instance that the fully charged battery exists.

The method may further comprise operating in a discharge mode when the battery swapping station reaches a preset idle time.

The operating in the discharge mode may include: checking whether or not any fully charged battery exists among the at least one battery; when a fully charged battery exists, checking whether there is a battery being charged among at least one battery other than the fully charged battery; and when there is no battery being charged, discharging the fully charged battery to a size of a battery drain.

The battery drain may be a magnitude of current that can be discharged by the at least one battery at the maximum at one time.

The method may further comprise: when at least one battery among the at least one battery other than the fully charged battery is being charged, switching a direction of output power of a DC/DC converter, of the battery swapping station, connected to the fully charged battery; and charging the at least one battery being charged in the standard charge mode.

The method may further comprise charging at least one battery among the at least one battery that has not been fully charged by operating in the standard charge mode in the instance that any fully charged battery does not exist.

The method may further comprise switching to the standard charge mode and operating in the standard charge mode when the fully charged battery is exchanged by a user.

Advantageous Effects

A battery swapping station and a battery charging method using the same according to embodiments of the present invention may charge at least one battery accommodated in a battery charger according to a standard charge mode, a fast charge mode, and a discharge mode, thereby rapidly charging a target battery using allocated power provided from a grid and a charged battery without any additional power reinforcement work and preventing battery lifespan degradation caused from long-term persistence of fully charged state by adjusting a drain current of a battery that has been charged using the discharge mode, and thus, provide a high-efficiency and low-cost battery swapping station and a battery charging method using the same.

BRIEF DESCRIPTION OF THE DRAWINGS

FIG. 1 is a block diagram of a battery swapping station according to embodiments of the present invention.

FIG. 2 is a hardware block diagram of a controller of a battery swapping station according to embodiments of the present invention.

FIG. 3 is a flowchart of a battery charging method using a battery swapping station according to embodiments of the present invention.

FIG. 4 is a flowchart of a battery charging method according to a discharging mode of a battery swapping station according to embodiments of the present invention.

D: battery swapping station R: ground resistor
1000: AC/DC converter 3000: DC/DC converter
5000: switch 7000: controller
100: memory
200: processor
300: transceiver
400: input interface
500: output interface
600: storage device
700: bus

BEST MODE

The present invention may be modified in various forms and have various embodiments, and specific embodiments thereof are shown by way of example in the drawings and will be described in detail below. It should be understood, however, that there is no intent to limit the present invention to the specific embodiments, but on the contrary, the present invention is to cover all modifications, equivalents, and alternatives falling within the spirit and technical scope of the present invention. Like reference numerals refer to like elements throughout the description of the figures.

It will be understood that, although the terms such as first, second, A, B, and the like may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes combinations of a plurality of associated listed items or any of the plurality of associated listed items.

It will be understood that when an element is referred to as being "coupled" or "connected" to another element, it can be directly coupled or connected to the other element or an intervening element may be present. In contrast, when an element is referred to as being "directly coupled" or "directly connected" to another element, there is no intervening element present.

Terms used in the present application are used only to describe specific embodiments, and are not intended to limit the present invention. A singular form includes a plural form if there is no clearly opposite meaning in the context. In the present application, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

Unless otherwise defined, all terms used herein, including technical and scientific terms, have the same meanings as commonly understood by one skilled in the art to which the present invention belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a block diagram of a battery swapping station according to embodiments of the present invention.

Referring to FIG. 1, the battery swapping station D may charge at least one battery acquired from a user and provide a charged battery to the user.

More specifically, the battery swapping station D may be provided in at least one facility where power is provided. Accordingly, the battery swapping station D may receive power allocated from the corresponding facility through the grid. Here, the allocated power may be power allocated from a corresponding facility to charge at least one battery accommodated in the battery swapping station D.

Hereinafter, the battery swapping station D according to embodiments of the present invention will be described in more detail for each configuration.

The battery swapping station D may include a battery charger (not shown), an AC/DC converter 1000, a DC/DC converter 3000, a switch 5000, and a controller 7000.

In addition, the battery swapping station D may interwork with an external server. Accordingly, the battery swapping station D may receive a battery exchange request message requested from a user through the external server.

A plurality of battery chargers (not shown) are provided and may accommodate at least one battery inserted from the outside by a user. Accordingly, the battery swapping station D may charge at least one battery accommodated in a battery charger (not shown). For example, a battery accommodated in a battery charger (not shown) may have a voltage of 100V, a charge current capacity of 30000 mAh, and a power amount of 3000 Wh.

In addition, the battery swapping station D may provide a fully charged battery among batteries accommodated in at least one battery charger (not shown) to a user.

A maximum charging current may be set for the battery charger (not shown). Accordingly, the controller 7000, which will be described later, can prevent the battery from being fully charged and degraded before the user arrives at the battery swapping station D during operation in a fast charge mode.

A plurality of AC/DC converters 1000 may be provided and may be individually connected to battery chargers (not shown) through DC/DC converters 3000 to be described later.

In other words, one end of the AC/DC converter 1000 may be connected to the grid, and the other end may be connected to the DC/DC converter 3000 individually. Accordingly, the AC/DC converter 1000 may individually transfer allocated power provided through the grid of the corresponding facility to a battery charger (not shown) through the DC/DC converter 3000.

According to an embodiment, the AC/DC converter 1000 may divide the power provided from the grid to amount of power allocated by the controller 7000 and provide each divided power to the DC/DC converter 3000. Accordingly, the DC/DC converter 3000 may transfer the divided amount of power to each battery charger (not shown).

Here, the AC/DC converter 1000 may convert a form of allocated power provided through the grid. For example, the AC/DC converter 1000 may convert the allocated power which was provided in a form of alternating current through the grid into a direct current form and separately provide it to the battery charger (not shown). Accordingly, a battery that is accommodated in a battery charger (not shown) and uses DC power can be charged.

As described above, the DC/DC converter 3000 may have one end individually connected to the AC/DC converter 1000 and the other end individually connected to a battery charger (not shown). Accordingly, the DC/DC converter 3000 can stably supply the DC power received from the AC/DC converter 1000 to the battery accommodated in the battery charger (not shown). For example, the DC/DC converter 3000 may be provided as a bi-directional DC/DC converter.

In addition, the DC/DC converter 3000 may be connected to a controller 7000 to be described later. Accordingly, the DC/DC converter 3000 may operate in a buck mode or a boost mode according to a charge mode of the controller 7000.

In more detail according to an embodiment, when the controller 7000 operates in a standard charge mode, the DC/DC converter 3000 may operate in a buck mode. The DC/DC converter 3000 in the buck mode may output power that is input from the AC/DC converter 1000 as it is, wherein the AC/DC converter 1000 is individually connected to the DC/DC converter 3000.

More specifically, according to another embodiment, when the controller 7000 operates in a fast charge mode, as to some of DC/DC converters 3000, directions of charging power may be switched from the battery chargers (not shown) to the grid direction by the controller 7000, and these DC/DC converters 3000 may operate in a boost mode. The inputs and outputs in the boost mode may be opposite to the inputs and outputs in the buck mode.

More specifically, the fast charge mode may be an operation mode of the controller 7000 that is executed when a battery exchange request message is received from a user through an external server. In the fast charge mode, a target battery to be exchanged may be selected and the target battery may be rapidly charged.

For fast charging of the target battery, at least one other DC/DC converter 3000 other than the DC/DC converter 3000 connected to the target battery is controlled by the controller 7000 to switch power transfer direction from the battery charger (not shown) to the grid direction. Accordingly, at least one other DC/DC converter 3000 may transmit charging power of at least one battery connected to the at least one other DC/DC converter 3000 to the DC/DC converter to which the target battery is connected.

In other words, when the controller 7000 operates in a fast charge mode, at least one other DC/DC converter 3000 other than the specific DC/DC converter 3000 connected to the target battery may operate in a boost mode.

According to an embodiment, at least one other DC/DC converter 3000 operating in the boost mode may change its output voltage by adjusting an opening/closing time ratio of the DC/DC converter.

For example, when an output voltage of the AC/DC converter 1000 is 400 Vdc, the output voltage of an output terminal of the DC/DC converter 3000 connected to the target battery, the output terminal of the DC/DC converter 3000 being connected to the AC/DC converter 1000 may be changed to 399 Vdc by the controller (7000).

In addition, the input voltage of the input terminal of at least one other DC/DC converter 3000 operating in the buck mode, except for the DC/DC converter connected to the target battery, the input terminal of at least one other DC/DC converter 3000 being connected to the AD/DC converter 1000, may be adjusted to 400 Vdc. Accordingly, when the controller 7000 operates in a fast charge mode, the target battery can be rapidly charged through the DC/DC converter 3000 operating in the booster mode.

The standard charge mode and the fast charge mode will be described in more detail when the controller 7000 will be described later.

The switch 5000 may be individually connected between a battery charger (not shown) and the DC/DC converter 3000.

In addition, the switch 5000 is switched to an ON state in a discharge mode of the controller 7000, and the battery can be discharged by grounding the battery.

More specifically, when all the batteries in the battery swapping station D are fully charged or charged to a predetermined reference, the switch 5000 connected to a fully charged battery may be turned ON by the controller 7000, thereby discharging the battery with a battery drain size.

Here, the battery drain may be a size of current that can be discharged at the maximum at one time in a battery. Here, the size of the battery drain (Drain) may be individually adjusted by a resistor (R) connected to a ground direction.

The controller 7000 may control a battery charging operation of the battery swapping station D.

More specifically, the controller 7000 may operate in a standard charge mode, a fast charge mode, and a discharge mode.

The standard charge mode may be a basic charge mode performed when at least one battery is mounted in a battery charger (not shown).

According to an embodiment, the controller 7000 may equally distribute and supply allocated power transmitted from the grid to at least one battery charger (not shown) in a standard charge mode.

For example, the controller 7000 when operating in a standard charge mode may supply charging power of 2.5 KWh to each of battery chargers (not shown) in case that the allocated power is 10 KWh and four battery chargers (not shown) are provided.

In addition, in the standard charge mode, the battery charger (not shown) may charge the battery accommodated in the battery charger (not shown) at a 0.5 C-rate by the controller 7000, and may supply a charging current of 15 A.

Here, the C-rate may be an amount that can be charged for a corresponding time when a battery is charged with a specific constant current. For example, when a battery having a charge capacity of 30000 mAh is used, a battery charger (not shown) may output a maximum charging current of 300 mA at a 0.5 C-rate.

The fast charge mode may be a mode performed when a battery exchange message is received by a user through an external server.

As described above, the controller 7000 may select a target battery for fast charging when operating in the fast charge mode. Here, the target battery is a target battery to be exchanged according to a user request, and a battery with the highest charge rate among at least one battery accommodated in the battery swapping station D, at the time when the battery exchange request message is received, may be selected as a target battery.

Thereafter, the controller 7000 may change the operation modes of other DC/DC converters 3000 other than the DC/DC converter 3000 connected to the target battery to a boost mode. Here, the controller 7000 may set the input voltage of at least one other battery other than the target battery higher than the output voltage of the target battery, so that the target battery may be rapidly charged using the allocated power provided from the grid and the charged power of the batteries connected to other DC/DC converters 3000.

Here, the controller 7000 may calculate an allowable current value by setting a threshold value for the current delivered to the target battery so that charging of the target battery can be completed when the user arrives.

In more detail about the method of calculating the allowable current value, the controller 7000 may check a state current of the selected target battery. According to an embodiment, the state current of the battery may be provided in units of mA.

Thereafter, the controller 7000 may calculate a battery charge capacity (State of Charge) required to complete charging of the target battery.

According to an embodiment, the charge capacity of the target battery may be a value obtained by subtracting the state current of the target battery at the time when the battery exchange request message is received from the maximum current capacity of the target battery.

The controller 7000 may check information about an expected time of arrival of the user at the battery swapping station D, which is included in the battery exchange request message.

Thereafter, the controller 7000 may calculate the allowable current IP of the target battery so that charging of the target battery can be completed according to the expected arrival time of the user.

According to an embodiment, the allowable current value ($I_P$) of the battery may be calculated as in Equation 1 below.

$$I_P=(((A_{total}-A_{current})/T_{min})/60)/1000 \quad \text{[Equation 1]}$$

$I_P$: permissible current per hour of target battery (Ah)
$A_{total}$: maximum current capacity (mA) of target battery
$A_{current}$: state current of target battery (mA)
$T_{min}$: estimated time of user's arrival (min)

For example, the controller 7000 may supply an allowable current of 60 A to the target battery in a fast charge mode, and for this purpose, the controller 7000 may discharge at least one other battery other than the target battery at a 2 C-rate.

Here, the C-rate may be an amount that can be discharged for a corresponding time when the battery is discharged with a specific constant current. For example, if a battery with a charging capacity of 30000 mAh is used, the battery can output a maximum charging current of 1200 mA at a 2 C-rate.

Conventional battery charging devices do not consider an allowable current for charging the battery, but set a charging current to the maximum value. Accordingly, in the conventional battery charging device, battery charging is completed before a user arrives and the battery charging continues even after the battery is fully charged, so that battery deterioration is accelerated.

Meanwhile, the controller 7000 in the battery swapping station D according to embodiments of the present invention may set an allowable current value for adjusting a charging time of the battery in real time so that charging of the target battery can be completed according to the expected arrival time of the user, thus preventing deterioration of the battery.

The discharge mode may be a control mode that is operated when a predetermined time elapses after the battery is completely charged.

For example, in the instance that a specific battery that has been fully charged among at least one battery accommodated in a battery charger (not shown) exists, the controller 7000 may control a switch operation to ON state according to whether a battery being charged among other batteries excluding the specific battery exists.

According to an embodiment, the controller 7000 may switch a charging direction of the DC/DC converter 3000 connected to a specific fully charged battery in the instance that there is a battery being charged among other batteries. Accordingly, the controller 7000 may increase charging power of the battery being charged and prevent a state of health (SoH) of the fully charged battery from deteriorating.

According to another embodiment, the controller 7000 may turn on at least one switch 5000 connected to the fully charged batteries when all the batteries are fully charged or charged to a predetermined standard, thereby discharging the battery with a drain size. For example, the controller 7000 may discharge the battery with a drain level until a state of charge (SOC) of the battery becomes 90%.

Operations according to control modes of the controller 7000 will be described in more detail when a battery charging method is described later.

In addition, the controller 7000 may operate with at least one hardware configuration. The hardware configuration of the controller 7000 will be described in detail with reference to FIG. 2 below.

FIG. 2 is a hardware block diagram of a controller of a battery swapping station according to embodiments of the present invention.

Referring to FIG. 2, the controller 7000 may include a memory 100, a processor 200, a transceiver 300, an input interface 400, an output interface 500, and a storage device 600.

According to an embodiment, each of the components 100, 200, 300, 400, 500, and 600 included in the controller 7000 may be connected by a bus 700 to communicate with each other.

Among the components 100, 200, 300, 400, 500, and 600 of the controller 7000, the memory 100 and the storage device 600 may be configured with at least one of a volatile storage medium and a non-volatile storage medium. For example, the memory 100 and the storage device 600 may include at least one of a read only memory (ROM) and a random access memory (RAM).

Among them, the memory 100 may include at least one command executed by the processor 200.

According to an embodiment, the at least one command includes a command to charge at least one battery accommodated in the battery charger; a command to check whether a battery exchange request message transmitted from a user through an external server is received; a command to operate in a standard charge mode and charging at least one battery accommodated in the battery charger in the instance that the battery exchange request message has not been received; a command to check whether a fully charged battery among the at least one battery exists in the instance that the battery exchange request message is received; and in the instance that any fully charged battery does not exist, a command to select a battery having the highest charge rate among the at least one battery as a target battery at the time when the battery exchange request message is transmitted and operating in a fast charge mode to fast charging the target battery.

The processor 200 may mean a central processing unit (CPU), a graphics processing unit (GPU), or a dedicated processor on which methods according to embodiments of the present invention are performed.

As described above, the processor 200 may execute at least one program command stored in the memory 100.

In the above, the battery swapping station according to embodiments of the present invention has been described. Hereinafter, a battery charging method according to operations of the controller of the battery swapping station will be described in detail.

FIG. 3 is a flowchart of a battery charging method using a battery swapping station according to embodiments of the present invention.

Referring to FIG. 3, the controller 7000 in the battery swapping station may charge at least one battery accommodated in a battery charger (not shown) (S1000). Here, the controller 7000 may charge at least one battery in a standard charge mode.

According to an embodiment, the controller 7000 may equally distribute and supply allocated power transmitted from the grid to at least one battery charger (not shown) in a standard charge mode.

For example, when the allocated power is 10 KWh and four battery chargers (not shown) are provided, charging power of 2.5 KWh may be supplied to each of the battery chargers (not shown).

The controller 7000 may operate in a discharge mode (S3000) when the battery swapping station D reaches a preset idle time (S2000). Here, the idle time may be a time T elapsed after at least one charged battery in the battery charger (not shown) is fully charged.

In general, deterioration of a battery can be accelerated if the time a battery is maintained in a fully charged state is prolonged. Accordingly, the controller 7000 may operate in a discharge mode when at least one battery in a fully charged state reaches a preset idle time (S2000). The operation of the controller 7000 according to the discharge mode will be described in more detail with reference to FIG. 4 below.

FIG. 4 is a flowchart of a battery charging method according to a discharging mode of a battery swapping station according to embodiments of the present invention.

Referring to FIG. 4, when operating in a discharge mode, the controller 7000 may check whether a fully charged battery exists (S3100).

Here, in case that there is no fully charged battery, the controller 7000 may charge at least one uncharged battery by maintaining its operation in the standard charge mode (S3300).

Meanwhile, when a fully charged battery exists, the controller 7000 may check whether a battery being charged exists (S3500).

According to an embodiment, when other batteries other than a specific battery that has been fully charged are being charged, the controller 7000 may change a charging direction of the DC/DC converter 3000 connected to the specific battery. Thereafter, the controller 7000 may maintain operation in the standard charge mode (S3300). Accordingly, the controller 7000 may increase charging power of the battery being charged by distributing allocated power to the other battery chargers (not shown) except for the charger (not shown) of the battery that has been fully charged, thereby preventing deterioration of a lifespan (State of Health: SoH) of a fully charged battery.

According to another embodiment, the controller 7000 turns on at least one switch 5000 connected to a fully charged battery when there is no battery being charged, in other words, when charging of all batteries is completed, discharge the battery with a drain size (S3700).

Here, the battery drain may be a size of current that can be discharged at the maximum at one time in the battery. Here, the size of the battery drain (Drain) may be individually adjusted by a resistor (R) connected in the ground direction.

According to an embodiment, the controller 7000 may discharge the battery with a drain level until a state of charge (SOC) of the battery reaches a stable state. For example, the controller 7000 may discharge the battery with a drain level until a state of charge (SOC) of the battery becomes 90%.

Meanwhile, a battery that is discharged with a battery drain size according to an embodiment of the present invention is not limited to the description, and a fully charged battery or a battery that is charged over a predetermined reference set by a user may be applied.

Referring back to FIG. 3, when the idle time has not reached (S2000), the controller 7000 may check whether a battery exchange request message transmitted from the user through an external server is received (S4000). For example, the battery exchange request message may include information about an expected time of arrival of a user moving toward a battery swapping station. For example, the estimated arrival time information may be described and provided in minutes.

According to an embodiment, when the battery exchange request message is not received, the controller 7000 may maintain its operation in a standard charge mode (S5000) to charge at least one battery accommodated in a battery charger (not shown).

According to another embodiment, when a battery exchange request message is received, the controller 7000 may check whether a fully charged battery exists among at least one battery accommodated in a battery charger (not shown) (S6000). According to an embodiment, the controller 7000 may determine whether a fully charged battery exists by checking a charge current capacity (mAh) of at least one battery at the time when the battery exchange request message is transmitted.

Here, if a fully charged battery exists, the controller 7000 may maintain its operation in the standard charge mode (S5000) to charge at least one battery that has not been fully charged.

Meanwhile, when a fully charged battery does not exist, the controller 7000 may select a battery having the highest charge rate as a target battery at the time when the battery exchange request message is received.

Thereafter, the controller 7000 may check information on the expected time of arrival of the user to determine whether or not the target battery can be fully charged within the expected time of arrival of the user (S7000).

More specifically, the controller 7000 may calculate the sum of allocated power transmitted from the grid and the allowable power (see Equation 1) obtained from at least one battery excluding the target battery, and check if it is possible to fully charge the target battery within the expected arrival time of the user.

According to an embodiment, when it is not possible to fully charge the target battery within the expected arrival time, the controller 7000 may maintain its operation in the standard charge mode (S5000).

According to another embodiment, when it is possible to fully charge the target battery within the expected arrival time, the controller 7000 may switch its operation mode to a fast charge mode (S8000).

More specifically, as described above, the controller 7000, in the fast charge mode, may change the operation mode of other DC/DC converters 3000 other than the DC/DC converter 3000 connected to the target battery to a boost mode.

The controller 7000 may set an input voltage of at least one other battery other than the target battery higher than the target battery voltage, so that the controller 7000 can rapidly charge the target battery by charge current incoming from at least one other battery, together with the allocated power provided from the grid.

Thereafter, when the user exchanges the fully charged battery (S9000), the controller 7000 may change the charging mode to a standard charge mode and restart charging of a replaced discharged battery.

The battery swapping station and the battery charging method using the battery swapping station according to embodiments of the present invention have been described above.

A battery swapping station and a battery charging method using the same according to embodiments of the present invention may charge at least one battery accommodated in a battery charger according to a standard charge mode, a fast charge mode, and a discharge mode, thereby rapidly charging a target battery using allocated power provided from a grid and a charged battery without any additional power reinforcement work and preventing battery lifespan degradation caused from long-term persistence of fully charged state by adjusting a drain current of a battery that has been charged using the discharge mode, and thus, provide a high-efficiency and low-cost battery swapping station and a battery charging method using the same.

The operations of the method according to the embodiments of the present invention may be implemented as a computer-readable program or code on a computer-readable recording medium. The computer-readable recording medium includes all types of recording devices in which data readable by a computer system is stored. In addition, the computer-readable recording medium may be distributed in a network-connected computer system to store and execute computer-readable programs or codes in a distributed manner.

In addition, the computer-readable recording medium may include a hardware device, such as a ROM, a RAM, and a flash memory, specially configured to store and execute program instructions. The program instructions may include not only machine language codes such as those generated by a compiler, but also high-level language codes that can be executed by a computer by using an interpreter or the like.

Although some aspects of the invention have been described in the context of the apparatus, it may also represent a description according to a corresponding method, wherein a block or apparatus corresponds to a method step or feature of a method step. Similarly, aspects described in the context of a method may also represent a feature of a corresponding block or item or a corresponding apparatus. Some or all of the method steps may be performed by (or using) a hardware device, such as, for example, a microprocessor, a programmable computer, or an electronic circuit. In some embodiments, one or more of the most important method steps may be performed by such an apparatus.

In the forgoing, the present invention has been described with reference to the exemplary embodiment of the present invention, but those skilled in the art may appreciate that the present invention may be variously corrected and changed within the range without departing from the spirit and the area of the present invention described in the appending claims.

The invention claimed is:

1. A battery swapping station (BSS) configured to charge at least one battery individually accommodated in at least one battery charger, the battery swapping station comprising:

an AC/DC converter configured to convert external power provided in an alternating current (AC) form into a direct current (DC) form;

a DC/DC converter including a first end connected to the AC/DC converter and a second end individually connected to at least one battery accommodation unit to individually provide a part of external power input from the AC/DC converter to the at least one battery accommodation unit; and a controller connected to the DC/DC converter and configured to:

control an operation of the DC/DC converter according to an operation in a standard charge mode or in a fast charge mode, and in the fast charge mode, select a target battery among the at least one battery and fast charge the target battery.

2. The battery swapping station of claim 1, wherein the controller is further configured to, upon operating in the standard charge mode, control the DC/DC converter to execute a buck mode to output a part of the external power as it is.

3. The battery swapping station of claim 1, wherein the DC/DC converter is a bi-directional DC/DC converter.

4. The battery swapping station of claim 1, wherein the controller is further configured to, upon operating in the fast charge mode, set input voltages of other DC/DC converters excluding a specific DC/DC converter higher than an output voltage of the specific DC/DC converter which is connected to the target battery to switch power transmission direction, thereby guiding charge current towards the target battery.

5. The battery swapping station of claim 1, wherein the controller is further configured to operate in a discharge mode in the instance that a user does not use the battery swapping station for a preset idle time.

6. The battery swapping station of claim 5, further comprising a switch individually connected between the at least one battery charger and the DC/DC converter and configured to ground the at least one battery by switching to an ON state in the instance that the controller is in a discharge mode.

7. A method of charging at least one battery individually accommodated in a battery charger by a battery swapping station, the method comprising:

charging the at least one battery accommodated in the battery charger;

checking whether a battery exchange request message transferred from a user through an external server is received;

operating in a standard charge mode and charging the at least one battery accommodated in the battery charger in the instance that the battery exchange request message has not been received;

checking whether a fully charged battery among the at least one battery exists in the instance that the battery exchange request message is received; and in the instance that any fully charged battery does not exist, selecting a battery having the highest charge rate among the at least one battery as a target battery at the time when the battery exchange request message is received and operating in a fast charge mode to fast charge the target battery.

8. The method of claim 7, wherein the selecting the battery and operating in the fast charge mode to fast charge the target battery includes:

when a fully charged battery does not exist, selecting a battery having the highest charge rate among the at least one battery as the target battery when the battery exchange request message is transmitted at the time;

checking information about an expected time of arrival of the user and checking whether or not the target battery can be fully charged within the expected time of arrival of the user; and upon determining that it is possible to complete charging of the target battery within the expected time of arrival, fast charging the target battery by operating in the fast charge mode.

9. The method of claim 8, further comprising:

upon determining that it is not possible to complete charging of the target battery within the expected arrival time, maintaining operation in the standard charge mode to charge at least one non-charged battery among the at least one battery.

10. The method of claim 7, wherein the operating in the fast charge mode includes:

Changing operation modes of other direct current/direct current (DC/DC) converters except for a specific DC/DC converter connected to the target battery in the battery swapping station to a boost mode; and setting input voltages of the other DC/DC converters higher than an output voltage of the specific DC/DC converter to switch power transmission direction, thereby guiding charge current towards the target battery.

11. The method of claim 7, wherein the operating in the standard charge mode includes:

executing at least one direct current/direct current (DC/DC) converter in the battery swapping station in a buck mode to equally distribute and output external power.

12. The method of claim 7, further comprising charging at least one battery among the at least one battery that has not been fully charged by maintaining the operation in the standard charge mode in the instance that the fully charged battery exists.

13. The method of claim 7, further comprising operating in a discharge mode in when a predetermined idle time is reached.

14. The method of claim 13, wherein the operating in the discharge mode includes:

checking whether or not any fully charged battery exists among the at least one battery;

when a fully charged battery exists, checking whether there is a battery being charged among at least one battery other than the fully charged battery; and when there is no battery being charged, discharging the fully charged battery according to a size of a battery drain.

15. The method of claim 14, wherein the battery drain is a magnitude of current that can be discharged by the at least one battery at the maximum at one time.

16. The method of claim 14, further comprising:

when at least one battery among the at least one battery other than the fully charged battery is being charged, switching a direction of output power of a direct current/direct current (DC/DC) converter of the battery swapping station, which connected to the fully charged battery; and charging the at least one battery being charged in the standard charge mode.

17. The method of claim 14, further comprising:

charging at least one battery among the at least one battery that has not been fully charged by operating in the standard charge mode in the instance that any fully charged battery does not exist.

18. The method of claim 7, further comprising:

switching to the standard charge mode and operating in the standard charge mode when the fully charged battery is exchanged by a user.

* * * * *